Jan. 1, 1935.    A. C. SCHOEPFER    1,986,018
AQUARIUM
Filed Dec. 19, 1933
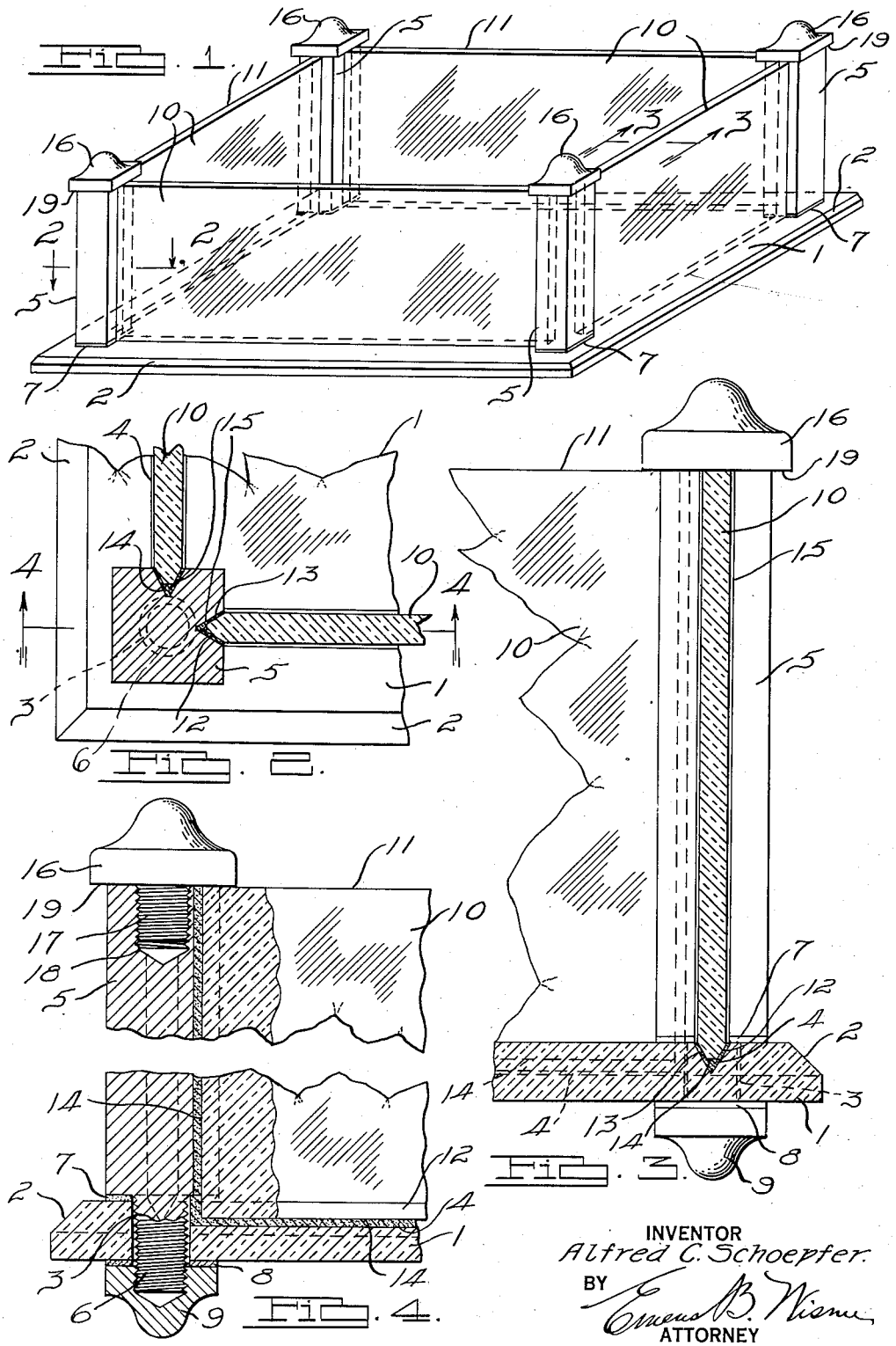
INVENTOR
Alfred C. Schoepfer.
BY
ATTORNEY Patented Jan. 1, 1935

1,986,018

UNITED STATES PATENT OFFICE 1,986,018

AQUARIUM

Alfred C. Schoepfer, Birmingham, Mich.

Application December 19, 1933, Serial No. 703,058

4 Claims. (Cl. 119—5)

This invention relates to aquariums and the object of the invention is to provide an aquarium of rectangular form and provided with a novel means for preventing leakage of water about the glass panels.

Another object of the invention is to provide an aquarium which may be formed entirely of glass so that the interior of the aquarium may be illuminated by placing a light beneath or at one side of the aquarium to light up the entire aquarium including its contents.

A further object of the invention is to provide an aquarium supported on the four corner posts which hold the sides and bottom of the aquarium together.

Another object of the invention is to provide an aquarium having a series of four upright corner posts extending through the base and providing a support therefor, the corner posts being arranged so that when the glass panels are fitted therein, nuts may be turned down on the tops of the corner posts to press the panels into the plastic material provided therefor in the V-shaped channels in the base.

A further object of the invention is to provide a means for maintaining sufficient cement or plastic material in the channels of the base to form a proper seal between the panels and the base.

These objects and the several novel features of the invention are hereinafter more fully described and claimed and the preferred form of construction by which these objects are attained is shown in the accompanying drawing in which—

Fig. 1 is a perspective view of an aquarium embodying my invention.

Fig. 2 is a section taken on line 2—2 of Fig. 1.

Fig. 3 is a section taken on line 3—3 of Fig. 1.

Fig. 4 is a section taken on line 4—4 of Fig. 2.

The aquarium comprises a glass base plate 1 which is provided with a beveled outer edge 2. A series of four holes 3 are drilled through the four corners of the base plate as shown in Figs. 2, 3 and 4 and these holes 3 are connected by V shaped grooves 4 cut into the upper surface of the base plate. Each corner post 5 is preferably square in cross section and is provided with a depending threaded end 6, as shown in Fig. 4, which is inserted through the apertures 3 and a gasket 7 is positioned about the threaded end 6 against the lower end of the corner post and fits against the upper face of the base plate. A second gasket 8 is positioned about the threaded end 6 against the bottom face of the base plate and a cap nut 9 is threaded onto the threaded end 6 and when turned up tight, puts a pressure on the gaskets 7 and 8 to prevent leakage at the corners of the aquarium. The glass panels 10 are rectangular in form and are each provided with a flat upper edge 11 while the other three edges of the panel are beveled at 12 and 13 on the opposite sides to provide a narrow flat edge 14 as shown in Figs. 2 and 3. The corner posts are provided with V shaped grooves 15 to receive the edges of the glass panels and these V shaped grooves in the corner posts align with and form continuations of the V shaped grooves 4 in the base plate 1.

In inserting the panels in position, the V shaped grooves 4 and 15 are filled with cement or other plastic material as shown and the panels are positioned in these grooves and displace some of the cement which can be readily scraped off when pressed out. In order to properly seat the panels in the V shaped grooves 4 of the base, a cap member 16 is provided for each corner post and each cap member is provided with a threaded stud 17 which is threaded into a threaded aperture 18 provided in the top of each corner post. As the cap is threaded downwardly, the lower face 19 thereof engages against the flat upper edges 11 of the adjacent panels and presses these panels downwardly into the V shaped grooves 4 in the base plate so that the lower edges of the panels are seated entirely in cement or plastic material. This arrangement maintains a pressure on the plastic material or cement in the V shaped channels 4 and it will be noted that under no condition can all of the cement or plastic material be pressed out of the channels. For instance, it is possible to press the glass panel 10 down into the channel until the beveled faces 12 and 13 of the panel engage against the angular faces of the V shaped channel 4 but there will always remain sufficient packing or cement between the flat lower face 14 of the panel and the bottom of the V shaped channel 4 to prevent leakage thereabout. This construction eliminates the possibility of squeezing all of the plastic material or cement out of the channel and thus a proper seal is maintained between the base and panels at all times.

With the aquarium constructed as shown, it is not necessary to provide a frame, as the corner posts extend through the base plate and the cap nuts 9 on the lower ends of the corner posts provide supports for the base plate. With all of the parts except the corner posts made of glass a very transparent aquarium is provided due to the absence of extra frame work and this type of aquarium lends itself admirably to illumination from the exterior. While I have suggested the use of glass for the base plate, it will be readily understood that the base plate could also be made of marble, slate or composition material. Also the channels 15 in the corner posts do not necessarily need to be V shaped as a straight sided channel will operate satisfactorily at this point.

From the foregoing description, it becomes evident that the device may be easily and quickly assembled, will not readily leak when so assembled, is of a pleasing appearance and provides a device which accomplishes the objects described.

Having thus fully described my invention, its utility and mode of operation, what I claim and desire to secure by Letters Patent of the United States is—

1. In an aquarium, a base plate having a series of apertures and having a series of channels in the upper surface thereof connecting the apertures, a series of corner posts each provided with a depending threaded end insertable through the apertures in the base plate, a cap nut threaded onto the lower end of each corner post beneath the base plate, each corner post being provided with vertical channels, a series of glass panels positioned in the vertical channels of the corner posts and extending into the channels of the base plate, the channels of the base plate and the vertical channels of the corner posts being filled with plastic material to seal the edges of the glass panels and a cap member threaded into the upper end of each corner post and engaging the upper edges of the adjacent panels to press the panels into the plastic material in the channels of the base plate.

2. In an aquarium, a base plate, a series of corner posts mounted therein and extending therethrough, a cap nut threaded onto the lower end of each corner post and securing the corner posts in the base plate, a series of channels in the upper face of the base plate connecting the corner posts, each corner post being provided with vertical channels in alignment with the channels of the base plate, the channels of the base plate and corner posts being filled with plastic material and a series of glass panels fitting in the channels of the corner posts and extending at the lower edge into the channels of the base plate and adjustable means on the corner posts for pressing the lower edges of the glass panels into the plastic filled channels of the base plate.

3. In an aquarium, a base plate having a series of apertures and a series of V shaped grooves in the upper surface connecting the apertures, a post having a depending threaded end extending through each aperture, a cap nut threaded onto the lower end of each post beneath the base plate and providing supports for the base plate, the V shaped grooves in the base plate being filled with plastic material, a series of glass panels positioned between the posts and resting at the lower edge on the plastic material in the V shaped grooves and means on the upper end of each post for pressing the lower edge of the glass panels into the V shaped grooves.

4. In an aquarium, a base plate, a series of corner posts mounted therein, a series of V shaped grooves in the upper face of the base plate extending between the corner posts, and a panel for each V shaped groove having beveled lower faces extending at the same angle as the sides of the V shaped groove and having a flat bottom edge, the V shaped grooves being filled with plastic material and the lower edges of the panels being pressed into the plastic material and being supported thereby.

ALFRED C. SCHOEPFER.